United States Patent
Chao et al.

(10) Patent No.: US 10,628,515 B2
(45) Date of Patent: Apr. 21, 2020

(54) METHOD FOR COMPRESSING INITIAL WEIGHT MATRIX CAPABLE OF REDUCING MEMORY SPACE

(71) Applicant: KaiKuTek INC., Taipei (TW)

(72) Inventors: Yu-Lin Chao, Taipei (TW); Chieh Wu, Hsinchu (TW); Chih-Wei Chen, Tainan (TW); Guan-Sian Wu, Taichung (TW); Chun-Hsuan Kuo, San Diego, CA (US); Mike Chun Hung Wang, Taipei (TW)

(73) Assignee: KaiKuTek INC., Taipei (TW)

( * ) Notice: Subject to any disclaimer, the term of this patent is extended or adjusted under 35 U.S.C. 154(b) by 0 days.

(21) Appl. No.: 16/109,735

(22) Filed: Aug. 22, 2018

(65) Prior Publication Data
US 2020/0065351 A1     Feb. 27, 2020

(51) Int. Cl.
G06F 17/16     (2006.01)
G06N 20/00     (2019.01)

(52) U.S. Cl.
CPC ............. *G06F 17/16* (2013.01); *G06N 20/00* (2019.01)

(58) Field of Classification Search
CPC .......... G06F 17/16; G06N 20/00; G06N 3/02; G06N 3/04; G06N 3/08
USPC ....................................................... 708/607
See application file for complete search history.

(56) References Cited

U.S. PATENT DOCUMENTS

2019/0303742 A1 * 10/2019 Bonnell .................. G06N 3/04

OTHER PUBLICATIONS

N. D. Sidiropoulos et al., Tensor Decomposition for Signal Processing and Machine Learning, IEEE Trans. on Sig. Proc., 2017 (Year: 2017).*
J-T Chien, et al., Tensor Factorized Neural Networks, IEEE Transactions on Neural Networks and Learning Systems, 2017 (Year: 2017).*
R. Koning et al., Block Kronecker Products and vecb Operator, Linear Algebra and its Applications 149:165-184, 1991 (Year: 1991).*

* cited by examiner

*Primary Examiner* — Andrew Caldwell
*Assistant Examiner* — Emily E Larocque
(74) *Attorney, Agent, or Firm* — Winston Hsu

(57) ABSTRACT

A method for compressing an initial weight matrix includes generating a first weight matrix and a second weight matrix according to the initial weight matrix where the initial weight matrix is a Kronecker product of a transposed matrix of the second weight matrix and the first weight matrix; optimizing the first and second weight matrixes to generate an optimized first weight matrix and an optimized second weight matrix; generating a processed data matrix according to an initial data matrix where the initial data matrix is vectorization of the processed data matrix; multiplying the processed data matrix by the optimized first weight matrix to generate a first product; multiplying the optimized second weight matrix by the first product to generate a second product; and vectorizing the second product. The initial weight matrix requires a larger memory space than a combined memory space of the first and second weight matrixes.

8 Claims, 7 Drawing Sheets

Optimize the first weight matrix and the second weight matrix to generate the optimized first weight matrix and the optimized second weight matrix by performing neural network training with the first weight matrix and the second weight matrix

FIG. 6

Optimize the first weight matrix and the second weight matrix to generate the optimized first weight matrix and the optimized second weight matrix by performing neural network training and quantizing a result of the neural network training

FIG. 7 optimize the first weight matrix and the second weight matrix to generate the optimized first weight matrix and the optimized second weight matrix by performing neural network training with the first weight matrix and the second weight matrix, and compressing a result of the neural network training with an entropy coding algorithm

FIG. 8

Store the initial weight matrix, the first weight matrix and the second weight matrix in a memory, and the memory is a random access memory, dynamic random access memory, static random access memory, or flash memory

FIG. 9

METHOD FOR COMPRESSING INITIAL WEIGHT MATRIX CAPABLE OF REDUCING MEMORY SPACE

BACKGROUND OF THE INVENTION

1. Field of the Invention

The invention relates a method for compressing an initial weight matrix, and more particularly, a method used to obtain a set of weight matrixes according to the initial weight matrix where the initial weight matrix requires a larger memory space than a combined memory space of the set of weight matrixes.

2. Description of the Prior Art

In the field of machine learning, in order to perform weighted calculations, it often results in a large amount of computations. A common calculation method is to put weight variables into a matrix to obtain a weight matrix, and then perform a weighted calculation by means of matrix multiplication using the weighted matrix. However, the weight matrix is often excessive and results in that the memory space cannot be reduced. In addition, there still lacks a solution to reuse hardware when performing weighted calculations under different layers to simplify hardware usage.

SUMMARY OF THE INVENTION

An embodiment provides a method for compressing an initial weight matrix. The method includes generating a first weight matrix and a second weight matrix according to the initial weight matrix where the initial weight matrix is a Kronecker product of a transposed matrix of the second weight matrix and the first weight matrix; optimizing the first weight matrix and the second weight matrix to generate an optimized first weight matrix and an optimized second weight matrix; generating a processed data matrix according to an initial data matrix where the initial data matrix is vectorization of the processed data matrix; multiplying the processed data matrix by the optimized first weight matrix to generate a first product; multiplying the optimized second weight matrix by the first product to generate a second product; and vectorizing the second product to generate vectorization of the second product. The vectorization of the second product is equal to a product of the initial weight matrix and the initial data matrix, and the initial weight matrix requires a larger memory space than a combined memory space of the first weight matrix and the second weight matrix.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 illustrates a step performed for optimizing the first weight matrix and the second weight matrix described in FIG. 4 according to an embodiment.

FIG. 7 illustrates a step performed for optimizing the first weight matrix and the second weight matrix described in FIG. 4 according to another embodiment.

FIG. 8 illustrates a step performed for optimizing the first weight matrix and the second weight matrix described in FIG. 4 according to another embodiment.

FIG. 9 illustrates a step of storing the initial weight matrix, the first weight matrix and the second weight matrix in a random access memory (RAM), dynamic random access memory (DRAM), static random access memory (SRAM), or flash memory according to an embodiment.

DETAILED DESCRIPTION

Figure 1:
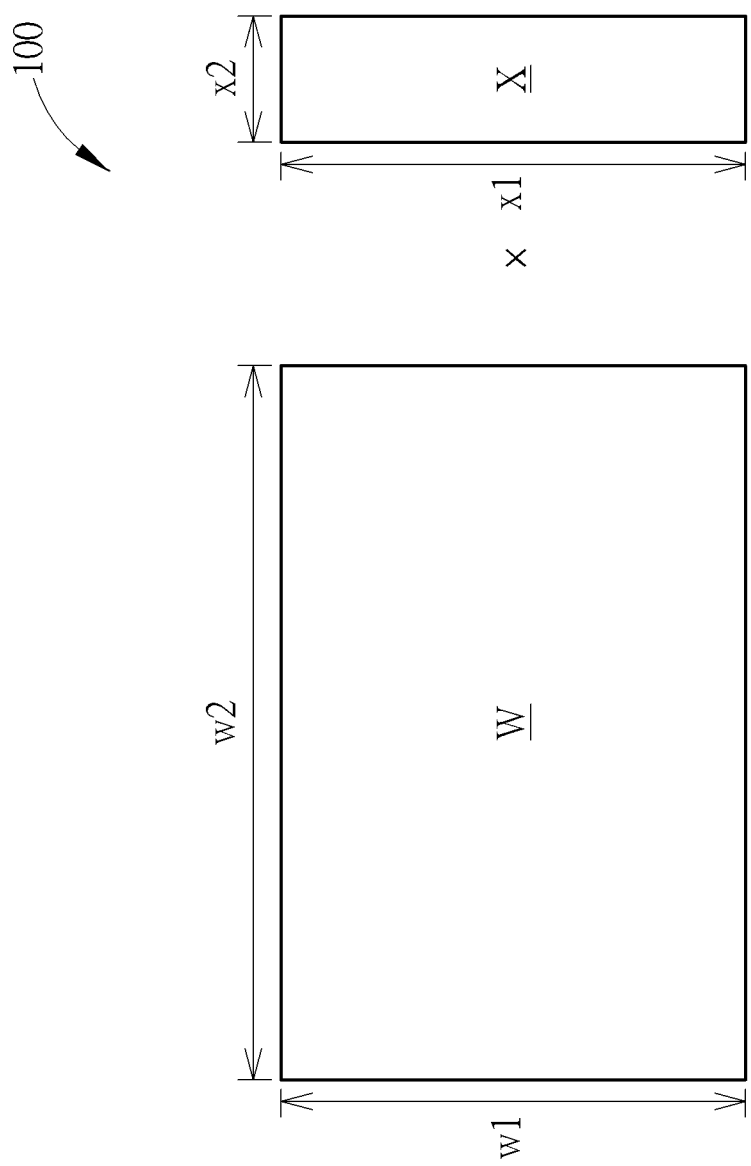
FIG. 1 illustrates a calculation of matrix multiplication according to an embodiment.

FIG. 1 illustrates a calculation of matrix multiplication 100 according to an embodiment. The matrix multiplication 100 may be performed by multiplying an initial data matrix X by an initial weight matrix W, that is, W×X. As shown in FIG. 1, the initial weight matrix may be a w1×w2 matrix, and the initial data matrix X may be a x1×x2 matrix, where w1 and w2 may respectively be the row count and the column count of the initial matrix W, x1 and x2 may respectively be the row count and the column count of the initial data matrix X, and w1, w2, x1, and x2 may be positive integers larger than zero. The matrix multiplication 100 may be performed when performing a weighted calculation. Each element of the initial weight matrix W may be a weight variable and be used for weighting a corresponding element of the initial data matrix X, and each element of the initial data matrix X may be a data variable needed to be processed. In other words, the elements of the initial weight matrix W may be used for adjusting the elements stored in the initial data matrix X. This process may be used for a machine learning system to calibrate the data stored in the initial data matrix X for recognizing the data stored in the initial data matrix X. For example, if the elements (i.e. data variables) stored in the initial data matrix X are raw data about gestures in a three-dimensional space and are obtained by detecting the gestures by a radar device, the initial weight matrix W may be used to calibrate the data in the initial data matrix X for better recognizing the gestures.

The initial weight matrix W may be optimized to improve the accuracy of the result of calibrating the initial data matrix X using the initial weight matrix W. The process of optimizing the initial weight matrix W may be a training process of machine learning. The training process may be performed with a neural network. However, since the initial weight matrix W may be large, it requires excessive memory space to perform neural network training directly with the initial weight matrix W.

Figure 2:
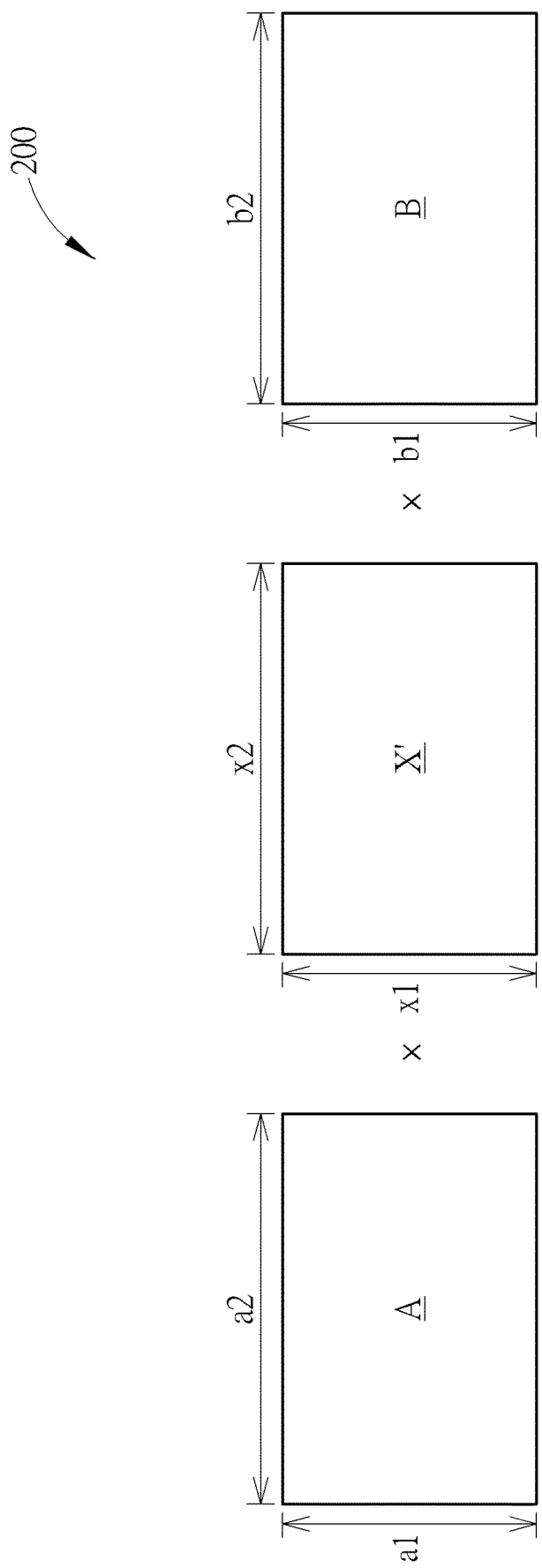
FIG. 2 illustrates a calculation of matrix multiplication corresponding to the matrix multiplication of FIG. 1.

In order to reduce the usage of memory space, a calculation as shown in FIG. 2 may be performed. FIG. 2 illustrates a calculation of matrix multiplication 200 corresponding to the matrix multiplication 100 of FIG. 1. The matrix multiplication 200 may be performed by multiplying a processed data matrix X' by a first weight matrix A to generate a first product A×X', and multiplying a second weight matrix B by the first product A×X' to generate a second product A×X'×B. According to an embodiment, the relationships among the initial weight matrix W, the initial data matrix X, the processed data matrix X', the first weight matrix A, and the second weight matrix B may be as follows.

$$W = B^T \otimes A \quad \text{(eq-1)};$$

$$X = vec(X'); \text{ and} \quad \text{(eq-2)}$$

$$W \times X = vec(A \times X' \times B) \quad \text{(eq-3)}.$$

As expressed in the equation eq-1, the initial weight matrix W may be a Kronecker product of a transposed matrix $B^T$ of the second weight matrix B, and the first weight matrix A. The Kronecker product is denoted by $\otimes$.

As expressed in the equation eq-2, the initial data matrix X may be vectorization of the processed data matrix X'.

As expressed in the equation eq-3, the vectorization of the second product (i.e. vec (A×X'×B)) may be equal to a product of the initial weight matrix W and the initial data matrix X, that is the product (W×X) shown in FIG. 1.

As shown in FIG. 2, the first weight matrix A may be an a1×a2 matrix, the processed data matrix X' may be an x1×x2 matrix, and the second weight matrix B may be a b1×b2 matrix, where a1 and a2 may respectively be the row count and the column count of the first weight matrix A, x1 and x2 may respectively be the row count and the column count of the processed data matrix X', b1 and b2 may respectively be the row count and the column count of the second weight matrix B, and a1, a2, x1, x2, b1 and b2 may be positive integers larger than zero.

Because a sum of a product of a1 and a2 and a product of b1 and b2 may be smaller than a product of w1 and w2 (i.e. (a1·a2+b1·b2)<(w1·w2)), the initial weight matrix W may require a larger memory space than a combined memory space of the first weight matrix A and the second weight matrix B. As a result, by performing neural network training with the first weight matrix A and the second weight matrix B instead of the initial weight matrix W, the required memory space may be effectively compressed and reduced. According to embodiments, the row counts and the line counts of the matrixes A and B may be adjustable, and the compression rate of the weight matrix may therefore be adjustable.

Here is an example of the foresaid operations. The initial weight matrix W and the initial data matrix X may be as follows.

$$W = \begin{bmatrix} 5 & 10 & 7 & 14 \\ 15 & 20 & 21 & 28 \\ 6 & 12 & 8 & 16 \\ 18 & 24 & 24 & 32 \end{bmatrix}$$

$$X = \begin{bmatrix} 9 \\ 0 \\ 1 \\ 2 \end{bmatrix}$$

According to the foresaid equations eq-1 and eq-2, the first weight matrix A, the second weight matrix B, and the processed data matrix X' may be obtained as follows.

$$A = \begin{bmatrix} 1 & 2 \\ 3 & 4 \end{bmatrix}$$

$$B = \begin{bmatrix} 5 & 6 \\ 7 & 8 \end{bmatrix}$$

$$X' = \begin{bmatrix} 9 & 0 \\ 1 & 2 \end{bmatrix}$$

According to the foresaid equation eq-3, the following equation may be derived.

$$W \times X = \begin{bmatrix} 83 \\ 211 \\ 98 \\ 250 \end{bmatrix}$$

$$= vec\left(\begin{bmatrix} 83 & 98 \\ 211 & 250 \end{bmatrix}\right)$$

$$= vec(A \times X' \times B)$$

As described in this example, the initial weight matrix W is a 4×4 matrix, and each of the matrixes A and B is a 2×2 matrix. Hence, the initial weight matrix W may require a larger memory space than a combined memory space of the first weight matrix A and the second weight space B. Hence, less hardware resource may be required, the computation speed may be improved, and the power consumption may be reduced. The above example is not used to limit the scope of embodiments. According to embodiments, the foresaid matrixes W, X, X', A, B may be stored in a random access memory (RAM), dynamic random access memory (DRAM), static random access memory (SRAM), or flash memory. No matter which sort of memory is used, the required memory space may be reduced using the method provided by embodiment.

Because the two weight matrixes A and B rather than the initial weight matrix W may be used to process the data stored in the initial data matrix X through using the processed data matrix X', it could be said that weight matrixes of a bilinear form may be used according to embodiments.

Figure 3:
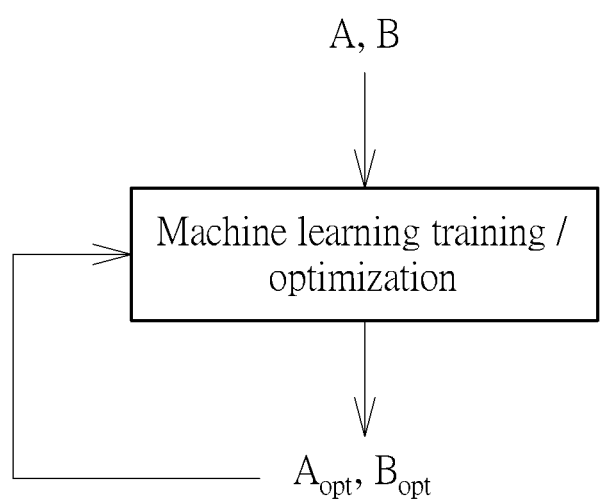
FIG. 3 illustrates a block diagram of optimizing the first weight matrix and the second matrix according to an embodiment.

FIG. 3 illustrates a block diagram of optimizing the first weight matrix A and the second matrix B according to an embodiment. As shown in FIG. 3, the initial weight matrix W may no longer be trained (optimized). Instead, the first weight matrix A and the second matrix B may be optimized by being trained with a machine learning process so as to generate an optimized first weight matrix $A_{opt}$ and an optimized second weight matrix $B_{opt}$. The training process may adjust the weight matrixes A and B by referring to the result of recognition of the data in the data matrix X. The training for the weight matrixes A and B may be performed recursively so as to continuously optimize the weight matrixes A and B for improving the result of machine learning. After obtaining the optimized weight matrixes $A_{opt}$ and $B_{opt}$, the optimized weight matrixes $A_{opt}$ and $B_{opt}$ may be used to replace the weight matrixes A and B. In other words, after obtaining the optimized weight matrixes $A_{opt}$ and $B_{opt}$, the right-hand side of the foresaid equation eq-3 may be rewritten as vec ($A_{opt}$×X'×$B_{opt}$), and this may substantially equal to the result of weighting the initial data matrix X.

Figure 4:
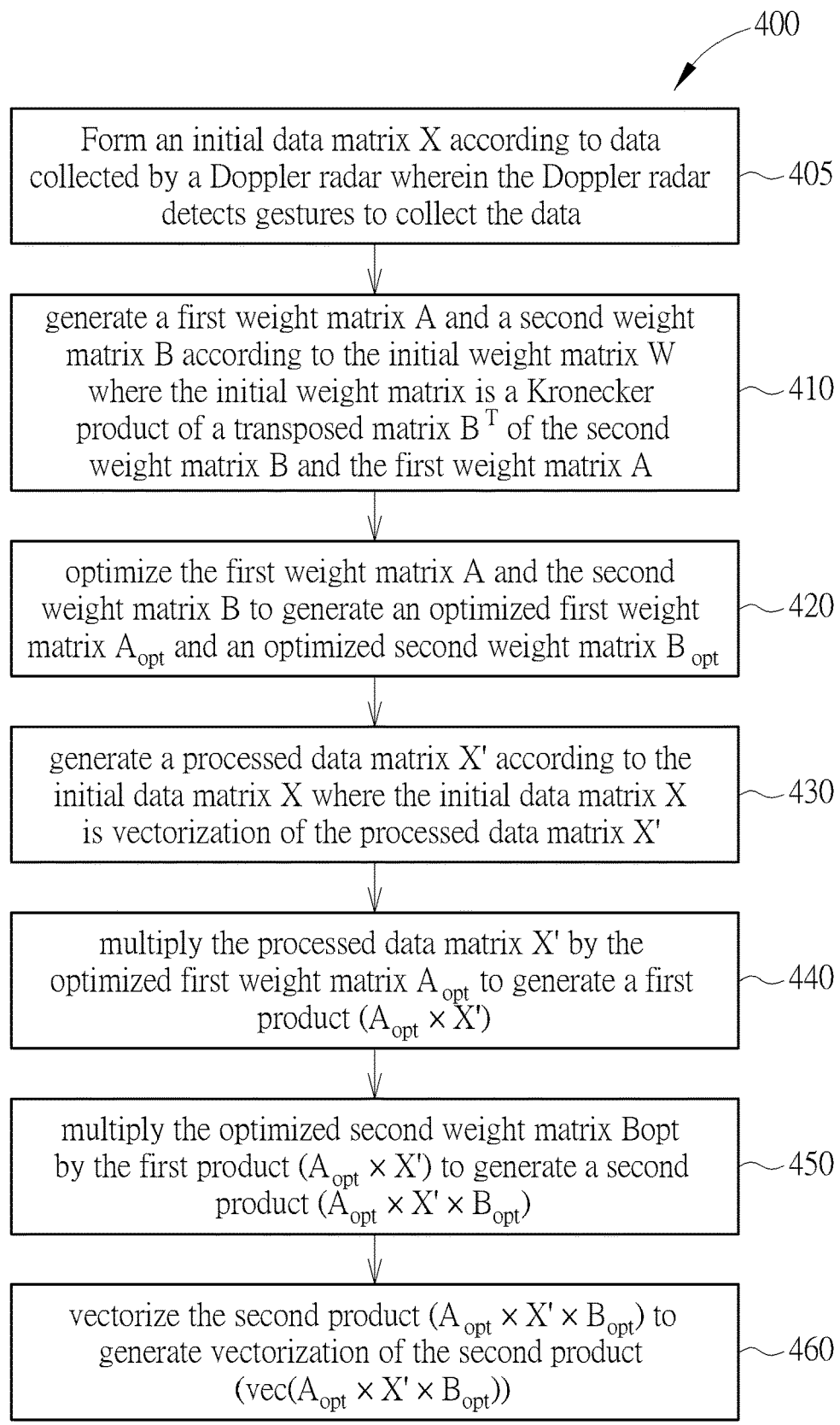
FIG. 4 illustrates a flowchart of a method corresponding to FIGS. 1-3 and according to an embodiment.

FIG. 4 illustrates a flowchart of a method 400 corresponding to FIGS. 1-3 and according to an embodiment. The method 400 may include the following steps.

Step 405: form an initial data matrix X according to data collected by a Doppler radar;

Step 410: generate a first weight matrix A and a second weight matrix B according to the initial weight matrix W where the initial weight matrix is a Kronecker product of a transposed matrix $B^T$ of the second weight matrix B and the first weight matrix A;

Step 420: optimize the first weight matrix A and the second weight matrix B to generate an optimized first weight matrix $A_{opt}$ and an optimized second weight matrix $B_{opt}$;

Step 430: generate a processed data matrix X' according to an initial data matrix X where the initial data matrix X is vectorization of the processed data matrix X';

Step 440: multiply the processed data matrix X' by the optimized first weight matrix $A_{opt}$ to generate a first product ($A_{opt} \times X'$);

Step 450: multiply the optimized second weight matrix $B_{opt}$ by the first product ($A_{opt} \times X'$) to generate a second product ($A_{opt} \times X' \times B_{opt}$); and Step 460: vectorize the second product ($A_{opt} \times X' \times B_{opt}$) to generate vectorization of the second product (vec($A_{opt} \times X' \times B_{opt}$)).

Regarding Step 410, Step 410 may be corresponding to the equation eq-1, and the matrixes A and B may be obtained according to the matrix W.

Regarding Step 420, the first weight matrix A and the second weight matrix B may be trained and optimized to generate the optimized first weight matrix $A_{opt}$ and the optimized second weight matrix $B_{opt}$ by performing neural network training with the first weight matrix A and the second weight matrix B according to an embodiment. The training process may be performed according to the result of decoding the data of the matrix X and the matrixes A, B and X.

According to another embodiment, the result of optimizing the weight matrixes A and B by performing the neural network training may be quantized to further compress the result. For example, if the trained weight matrixes A and B are of a floating point format, they may be quantized to be of a fixed-point format to be further compressed, and the required memory space may be further reduced. For example, the matrixes of a 32-bit format may be of an 8-bit format after being quantized.

According to another embodiment, the result of optimizing the weight matrixes A and B by performing the neural network training may be further compressed with an entropy coding algorithm. An entropy coding algorithm may assign a unique code to each symbol that occurs in the data. An entropy encoder may then compress data by replacing each fixed-length input symbol with a corresponding variable-length code. The most often used symbols may be replaced with the shortest codes, and the data may hence be compressed. For example, a Huffman coding algorithm may be used to compress the result of training the weight matrixes A and B.

Figure 5:
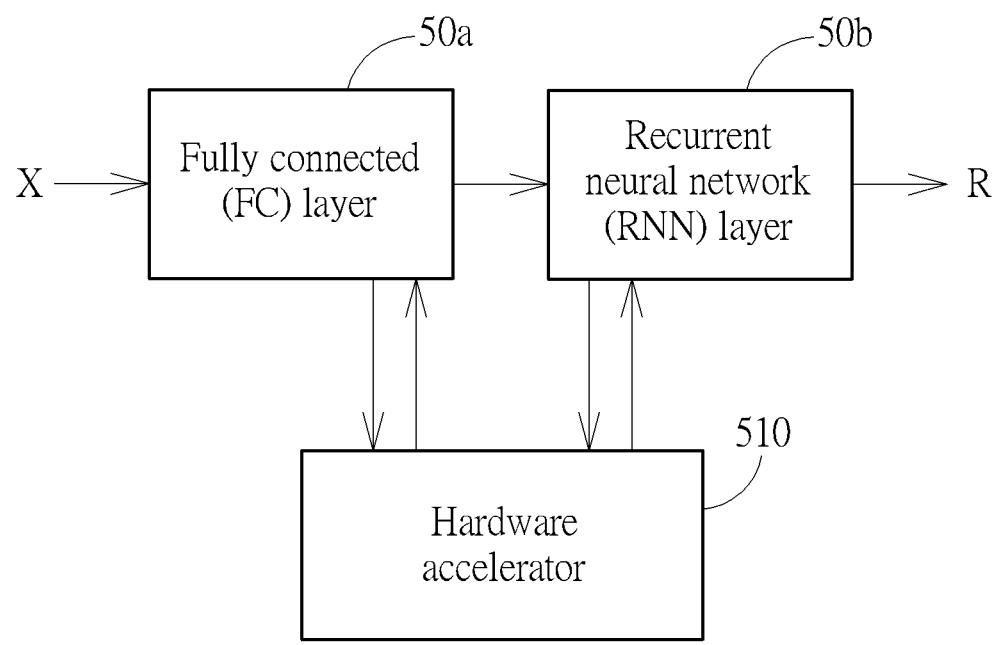
FIG. 5 illustrates a block diagram of applying the optimized weight matrixes according to an embodiment.

FIG. 5 illustrates a block diagram of applying the optimized weight matrixes $A_{opt}$ and $B_{opt}$ according to an embodiment. As shown in FIG. 5, the block 50a may refer to a process of fully connected (FC) layer of machine learning, and the block 50b may refer to a process of recurrent neural network (RNN) layer of machine learning. Each of the blocks 50a and 50b may correspond to specific hardware, software or integrated hardware-software. A hardware accelerator 510 may be reused among different layers of a process of machine learning according to embodiments. The initial data matrix X may be input into the block 50a to be processed under the FC layer, and then be processed in the block 50b under the RNN layer. When processing the data in the matrix X under FC layer, the data may be sent to a hardware accelerator 510 to be processed, and then be sent back. Then, under the RNN layer, the data may be sent to a hardware accelerator 510 to be processed, and then be sent back. According to FIG. 5, the output result R of the block 50b (RNN layer) may be corresponding to the weighted initial data matrix (W×X), and be used to decode the data in the matrix X. The hardware accelerator 510 may be used to multiply the processed data matrix X' by the optimized first weight matrix $A_{opt}$ to generate a first product ($A_{opt} \times X'$), multiply the optimized second weight matrix $B_{opt}$ by the first product ($A_{opt} \times X'$) to generate the second product ($A_{opt} \times X' \times B_{opt}$), and vectorize the second product ($A_{opt} \times X' \times B_{opt}$) to obtain vec ($A_{opt} \times X' \times B_{opt}$), i.e. the weighted initial data matrix X. In other words, Steps 440 to 460 may be performed using the hardware accelerator 510. The used set of weight matrixes $A_{opt}$ and $B_{opt}$ under an FC layer may be different from the used set of weight matrixes $A_{opt}$ and $B_{opt}$ under an RNN layer, however, the hardware accelerator 510 may still be able to be reused under different layers. According to an embodiment, Steps 430 to 460 may be performed using the hardware accelerator 510 under an FC layer and an RNN layer of machine learning process. Therefore, the hardware accelerator 510 may be reused among different layers of a process of machine learning according to embodiments. The hardware accelerator 510 may be of a microcontroller, a central processing unit, an application-specific integrated circuit, or a specific circuit unit which may perform calculations of multiplication, addition and/or trigonometric functions.

FIG. 6 illustrates a step performed for optimizing the first weight matrix and the second weight matrix described in FIG. 4 according to an embodiment. FIG. 7 illustrates a step performed for optimizing the first weight matrix and the second weight matrix described in FIG. 4 according to another embodiment. FIG. 8 illustrates a step performed for optimizing the first weight matrix and the second weight matrix described in FIG. 4 according to another embodiment. FIG. 9 illustrates a step of storing the initial weight matrix W, the first weight matrix A and the second weight matrix B in a random access memory (RAM), dynamic random access memory (DRAM), static random access memory (SRAM), or flash memory according to an embodiment.

For example, the initial data matrix X may be formed according to data collected by a Doppler radar. The data may be raw data about gestures in the three-dimensional space, and the output result R may be used to recognize the gestures.

In summary, a method of an embodiment may be used to compress the weight matrix so as to reduce the required hardware memory space, and it may be allowed to reuse an identical hardware accelerator under difference layers of a machine learning process. It may be easier for parallelization by separating a huge initial weight matrix to be two smaller weight matrixes. Hence, methods of embodiments may provide solutions for alleviating problems encountered in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for compressing an initial weight matrix, comprising:

forming an initial data matrix according to data collected by a Doppler radar wherein the Doppler radar detects gestures to collect the data;

generating a first weight matrix and a second weight matrix according to the initial weight matrix wherein the initial weight matrix is a Kronecker product of a transposed matrix of the second matrix and the first weight matrix;

optimizing the first weight matrix and the second weight matrix to generate an optimized first weight matrix and an optimized second weight matrix;

generating a processed data matrix according to the initial data matrix wherein the initial data matrix is vectorization of the processed data matrix;

multiplying the processed data matrix by the optimized first weight matrix to generate a first product by a hardware accelerator;

multiplying the optimized second weight matrix by the first product to generate a second product by the hardware accelerator; and vectorizing the second product to generate vectorization of the second product by the hardware accelerator;

wherein the vectorization of the second product is equal to a product of the initial weight matrix and the initial data matrix, the initial weight matrix, the first weight matrix and the second weight matrix are stored in a memory, and a memory space of the memory used to store the initial weight matrix is larger than a combined memory space of the memory used to store the first weight matrix and the second weight matrix.

2. The method of claim 1, wherein:

optimizing the first weight matrix and the second weight matrix to generate the optimized first weight matrix and the optimized second weight matrix is optimizing the first weight matrix and the second weight matrix to generate the optimized first weight matrix and the optimized second weight matrix by performing neural network training with the first weight matrix and the second weight matrix.

3. The method of claim 1, wherein optimizing the first weight matrix and the second weight matrix to generate the optimized first weight matrix and the optimized second weight matrix is optimizing the first weight matrix and the second weight matrix to generate the optimized first weight matrix and the optimized second weight matrix by performing neural network training and quantizing a result of the neural network training.

4. The method of claim 3, wherein the optimized first weight matrix and the optimized second weight matrix are quantized to an 8-bit format from a 32-bit format.

5. The method of claim 1, wherein optimizing the first weight matrix and the second weight matrix to generate the optimized first weight matrix and the optimized second weight matrix is optimizing the first weight matrix and the second weight matrix to generate the optimized first weight matrix and the optimized second weight matrix by performing neural network training with the first weight matrix and the second weight matrix, and compressing a result of the neural network training with an entropy coding algorithm.

6. The method of claim 5, wherein the entropy coding algorithm comprises a Huffman coding algorithm.

7. The method of claim 1, wherein multiplying the processed data matrix by the optimized first weight matrix to generate the first product, multiplying the optimized second weight matrix by the first product to generate the second product, and vectorizing the second product are performed under a fully connected layer and a recurrent neural network layer.

8. The method of claim 1, wherein the memory, is a random access memory, dynamic random access memory, static random access memory, or flash memory.

* * * * *